(12) United States Patent
Sip (10) Patent No.: US 9,761,017 B2
(45) Date of Patent: *Sep. 12, 2017

(54) AUTOMATIC METHOD OF SETTING A DESKTOP BACKGROUND COLOR AND ELECTRONIC DEVICE FOR USING THE SAME

(71) Applicant: Acer Incorporated, New Taipei (TW)

(72) Inventor: Kim-Yeung Sip, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,554

(22) Filed: Feb. 5, 2016

(65) Prior Publication Data

US 2016/0155246 A1    Jun. 2, 2016

Related U.S. Application Data

(63) Continuation-in-part of application No. 14/248,383, filed on Apr. 9, 2014, now Pat. No. 9,292,943.

(30) Foreign Application Priority Data

Dec. 6, 2013    (TW) .............................. 102144789 A (51) Int. Cl.
*G06T 11/00*    (2006.01)
*G06F 3/0488*    (2013.01)
(Continued)

(52) U.S. Cl.
CPC ............ *G06T 11/001* (2013.01); *G06F 3/039* (2013.01); *G06F 3/0416* (2013.01); *G06F 3/0488* (2013.01); *G06F 2200/1634* (2013.01)

(58) Field of Classification Search
None
See application file for complete search history.

(56) References Cited

U.S. PATENT DOCUMENTS

2009/0015593 A1    1/2009   Kang
2013/0314349 A1    11/2013  Chien et al.
(Continued)

FOREIGN PATENT DOCUMENTS

CN    203224818    10/2013

*Primary Examiner* — Vu Nguyen
(74) *Attorney, Agent, or Firm* — McClure, Qualey & Rodack, LLP (57) ABSTRACT

An automatic method of setting a desktop background is provided. The automatic method of setting a desktop background is applied to an electronic device which is combined with a protective cover, wherein the protective cover has a conducting area corresponding to a specific shape, location or area. The method includes the following steps of receiving protective cover information generated by a touch screen of the electronic device touching the conducting area of the protective cover; determining whether the protective cover information is in accordance with one of a plurality of preset protective cover information; and setting desktop background displayed by the touch screen according the preset protective cover information when the protective cover information is in accordance with one of the plurality of preset protective cover information.

16 Claims, 8 Drawing Sheets

(51) Int. Cl.
*G06F 3/039* (2013.01)
*G06F 3/041* (2006.01)

(56) References Cited

U.S. PATENT DOCUMENTS

| | | |
|---|---|---|
| 2013/0315419 A1 | 11/2013 | Chien et al. |
| 2013/0328917 A1* | 12/2013 | Zambetti ............... G06F 1/1626 |
| | | 345/620 |
| 2014/0267383 A1 | 9/2014 | Javidan |
| 2014/0282059 A1* | 9/2014 | Oh ........................ G06F 1/1641 |
| | | 715/744 |
| 2015/0065890 A1 | 3/2015 | Ishikawa |

* cited by examiner

| preset protective cover information | color information |
|---|---|
| 0000 | blue |
| 0001 | green |
| 0010 | red |

| preset protective cover information | subject information |
|---|---|
| 0000 | dog |
| 0001 | cat |
| 0010 | car |

AUTOMATIC METHOD OF SETTING A DESKTOP BACKGROUND COLOR AND ELECTRONIC DEVICE FOR USING THE SAME

CROSS REFERENCE TO RELATED APPLICATIONS

This application is a Continuation-In-Part of pending U.S. patent application Ser. No. 14/248,383 filed on Apr. 9, 2014, which claims priority to Taiwanese Application No. TW 102144789, filed on Dec. 6, 2013, the entireties of which are incorporated herein by reference.

BACKGROUND OF THE INVENTION

Field of the Invention

The present invention relates to a method of setting a desktop background color of an electronic device; in particular, the method relates to an automatic method of setting a desktop background color used for setting a desktop background color of an electronic device such that the desktop background color is consistent with a color of a protective cover combined with the electronic device.

Description of the Related Art

Portability has become an important goal in the development of computer technologies. Especially, the development of tablet computers and smart phones further leads people into a new era of portable electronics and deeply impacts people's computer use habits today. Typically, when people use a tablet computer, they also use a protective cover. Combining the protective cover with the tablet computer can protect the tablet computer so as to prevent a screen and a casing of the tablet computer from being scratched or damaged. On the other hand, the protective cover can also provide a function of supporting an electronic device to keep the tablet computer standing at an oblique angle or standing upright.

As the tablet computer becomes more popular, more types of protective covers are introduced. In addition, protective covers of the same type may be available in a variety of colors in order to satisfy different consumers' preferences.

Currently, a desktop background color of a tablet computer is predetermined in the factory when users start using the tablet computer. If the users desire to change the desktop background color, the users have to set the color manually. In addition, when a protective cover is used for covering a tablet, it is aesthetically pleasing for the users if the desktop background color is consistent with the color of the protective cover.

Therefore, it is necessary to provide a method for automatically setting a desktop background color according to the color of the protective cover.

BRIEF SUMMARY OF THE INVENTION

The primary objective of the present invention is to provide an automatic method of setting a desktop background which is applied to an electronic device which is combined with a protective cover, wherein the protective cover has a conducting area corresponding to a specific shape, location or area. The method comprises the following steps: receiving protective cover information generated by a touch screen of the electronic device touching the conducting area of the protective cover; determining whether the protective cover information is in accordance with one of a plurality of preset protective cover information; and setting desktop background displayed by the touch screen according the preset protective cover information when the protective cover information is in accordance with one of the plurality of preset protective cover information.

In some embodiments of the invention, the plurality of preset protective cover information is stored in the electronic device or a server.

In some embodiments of the invention, the method further comprise the step of setting the desktop background color displayed by the touch screen according to color information corresponding to the preset protective cover information. In some embodiments of the invention, the method further comprise the step of setting the desktop background subject displayed by the touch screen according to subject information corresponding to the preset protective cover information.

In some embodiments of the invention, the protective cover further has a non-conducting area, and the non-conducting area is a through hole. The through hole has a shape, and the shape of the through hole depends on the protective cover information.

In some embodiments of the invention, the protective cover further has a non-conducting area, and the non-conducting area is located on an inner surface of the protective cover, wherein a shape of the non-conductive area is a product logo.

In some embodiments of the invention, a cover body of the protective cover is all composed by the conducting area, wherein each cover body of a different shape corresponds to different protective cover information.

The present invention also provides an electronic device. The electronic device comprises a main body, a touch screen and a control system. The main body is combined with a protective cover, wherein the protective cover has a conducting area corresponding to a specific shape, location or area. The touch screen is connected with the main body, and used for generating protective cover information after touching the conducting area. The control system is electrically coupled with the touch screen, and used for receiving the protective cover information and for determining whether the protective cover information is in accordance with one of a plurality of preset protective cover information. In addition, the control system sets desktop background displayed by the touch screen according the preset protective cover information when the protective cover information is in accordance with one of the plurality of preset protective cover information. In some embodiments of the invention, the control system sets the desktop background color displayed by the touch screen according to color information corresponding to the preset protective cover information. In some embodiments of the invention, the control system sets the desktop background subject displayed by the touch screen according to subject information corresponding to the preset protective cover information.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are provided for explanation and understanding only.

DETAILED DESCRIPTION OF THE INVENTION

Figure 1:
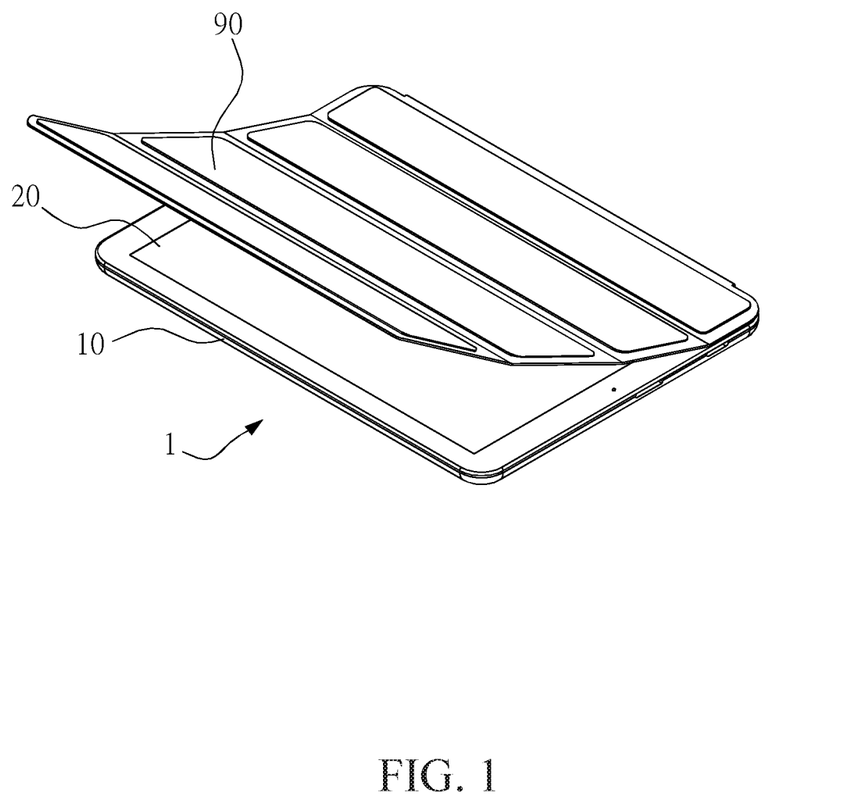
FIG. 1 is a top view of the electronic device according to the present invention when the electronic device combines with a protective cover in use.
Figure 2:
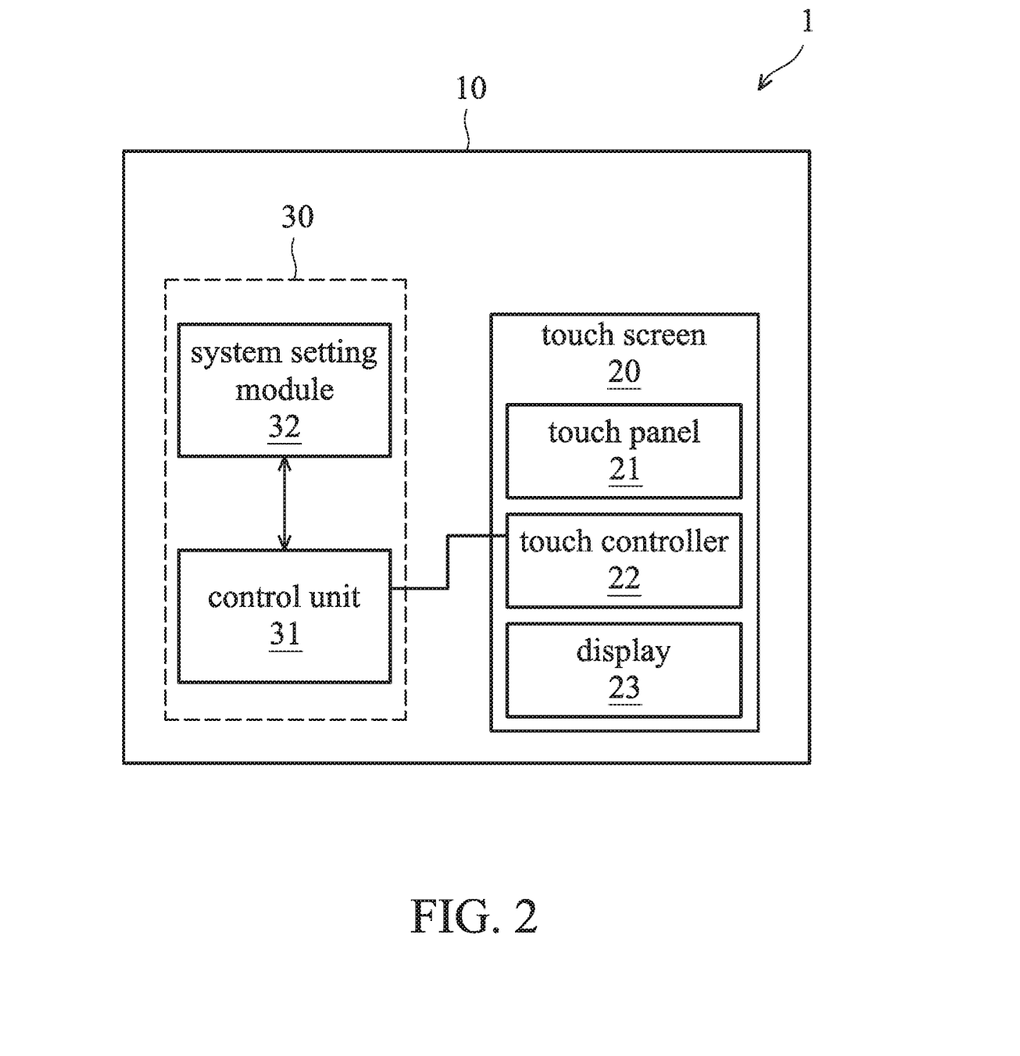
FIG. 2 is a device architecture diagram of the electronic device according to the present invention.
Figure 3:
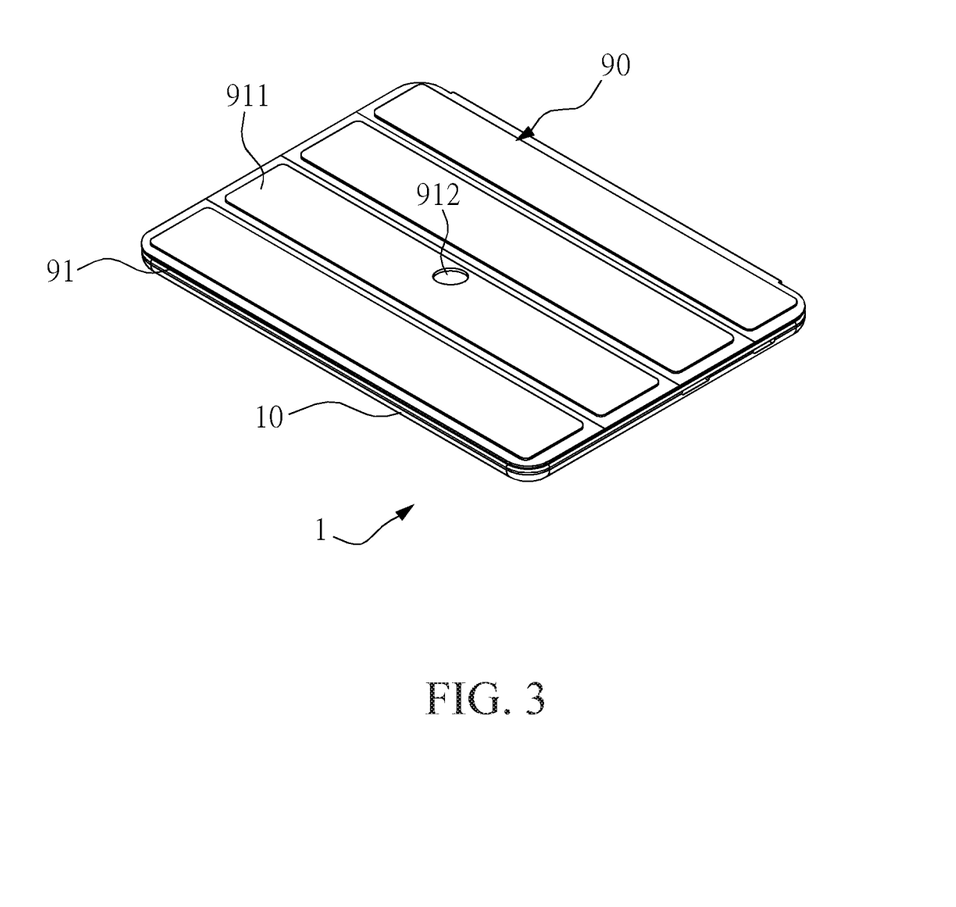
FIG. 3 is an implementation schematic diagram of the protective cover combined with the electronic device according to the present invention.
Figure 4:
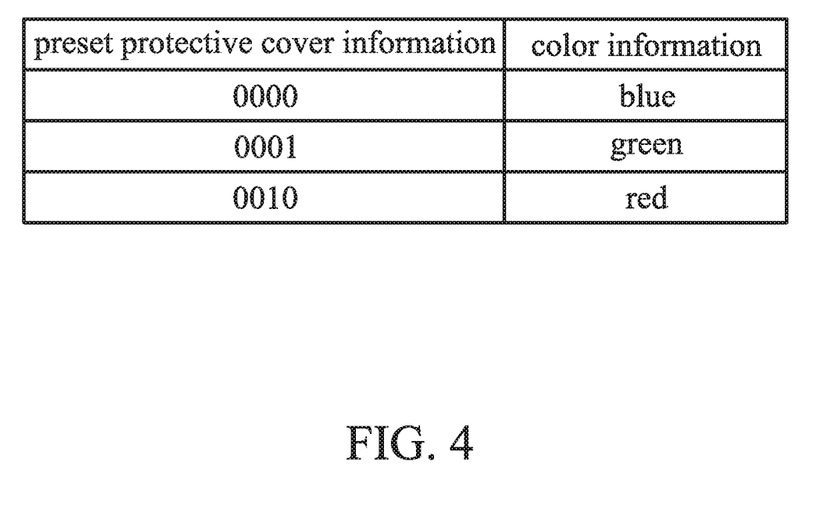
FIG. 4 is a lookup table illustrating the corresponding relationship between the preset protective cover information and the color information.

Please refer to FIG. 1 to FIG. 4; FIG. 1 is a top view of the electronic device according to the present invention when the electronic device combines with a protective cover in use; FIG. 2 is a device architecture diagram of the electronic device according to the present invention; FIG. 3 is an implementation schematic diagram of the protective cover combined with the electronic device according to the present invention; and FIG. 4 is a lookup table illustrating the corresponding relationship between the preset protective cover information and the color information.

As shown in FIG. 1, the electronic device 1 of the present invention can be combined with a protective cover 90 in use. In a specific embodiment of the present invention, the electronic device 1 is a tablet computer, but the scope of the present invention is not limited thereto.

As shown in FIG. 1 and FIG. 2, in an embodiment of the present invention, the electronic device 1 comprises a main body 10, a touch screen 20, and a control system 30, wherein the main body 10 can be combined with the protective cover 90.

The touch screen 20 is connected with the main body 10. The touch screen 20 comprises a touch panel 21, a touch controller 22, and a display 23. The touch panel 21 is used for generating coordinate sensing signals when the touch panel 21 is touched by a conductive object. The touch controller 22 is electrically coupled to the touch panel 21. The touch controller 22 is used for generating protective cover information according to the coordinate sensing signals generated by the touch panel 21 and for transferring the protective cover information to the control system 30. The display 23 is used for displaying desktop background colors and visual images. The principles and the detailed characteristics of the touch screen 20 are known technologies to people who are skilled in the art and are not repeated herein.

The control system 30 comprises a control unit 31 and a system setting module 32. The control unit 31 is used for receiving the protective cover information generated by the touch screen 20 and for determining whether the received protective cover information is in accordance with one of a plurality of preset protective cover information stored in the electronic device 1. In a specific embodiment of the present invention, the control unit 31 is an embedded controller (EC), but the scope of the present invention is not limited thereto. The preset protective cover information is detailed in the following description and is not elaborated here.

The system setting module 32 is used for setting the desktop background color displayed by the touch screen 20 of the electronic device 1 according to color information corresponding to the preset protective cover information when the received protective cover information is in accordance with one of the plurality of preset protective cover information. In a specific embodiment of the present invention, the system setting module 32 is an Advanced Configuration and Power Interface (ACPI), but the scope of the present invention is not limited thereto. The corresponding relationship between the preset protective cover information and the color information is detailed in the following description and is not elaborated here.

As shown in FIG. 3, in an embodiment of the present invention, the protective cover 90 combined with the electronic device 1 in use comprises a cover body 91. The cover body 91 comprises a conducting area 911 and a non-conducting area 912 formed by a through hole. The through hole is located in the central location of the cover body 91, and the shapes of the through hole are different according to the various colors of the protective covers. The shape of the through hole can be a circle, a rectangle, or a triangle. For example, if the through hole is a circle, the color of the protective cover 90 is green. If the through hole is a rectangle, the color of the protective cover 90 is red. If the through hole is a triangle, the color of the protective cover 90 is blue. However, the scope of the present invention is not limited to the abovementioned matching relationships. In a specific embodiment of the present invention, the conducting area 911 is formed by plastic materials mixed with conductive materials such as ABS resin, but the scope of the present invention is not limited thereto.

Please refer to FIG. 3 and FIG. 4; FIG. 4 is a lookup table illustrating the corresponding relationships between the preset protective cover information and the color information. As mentioned above, the cover body 91 used for covering the touch screen 20 of the electronic device 1 of the protective cover 90 is composed of a conducting area 911 and a non-conducting area 912. The shapes of the non-conducting areas 912 (i.e., the through holes) are different according to the colors of the protective cover 90. In other words, the shapes, locations, or areas of the conducting area 911 are different when the colors of the protective cover 90 are different. When the cover body 91 of a protective cover 90 of a different color touches the touch screen 20, the protective cover information generated by the touch screen 20 is different. That is to say, when a cover body 91 touches the touch screen 20, a cover body 91 having a conducting area of different shape, location, or area triggers the touch screen 20 to generate corresponding protective cover information. The protective cover information is generated by computation after integration of the coordinate sensing signals generated by the conducting area 911 touching the touch screen 20. In the example illustrated in FIG. 3 and FIG. 4, if the shape, the location, and the area of the through hole of the cover body 91 of the green protective cover 90 are as shown in FIG. 3, then the protective cover information generated by the conducting area 911 of the cover body 91 touching the touch screen 20 is set as 0001. In the current example, the color information corresponding to the preset protective cover information 0001 is set as green. If the conducting area 911 of the cover body 91 of a blue protective cover 90 touches the touch screen 20 and the touch screen 20 generates another protective cover information such as 0000, the color information corresponding to the preset protective cover information 0000 is set as blue, and so on. The shape, location, or area of the conducting area may vary depending on the color of the protective cover 90, so the protective cover information generated by the touch screen 20 touching a cover body 91 of a protective cover 90 of a different color is different too. As a result, by the above differences, the corresponding relationship between the protective cover information and the color information can be set in advance, as in the lookup table shown in FIG. 3, such that the control system 30 can determine whether the desktop background color needs to be changed and, if so, what color the desktop background color needs to be set to.

Figure 5A:
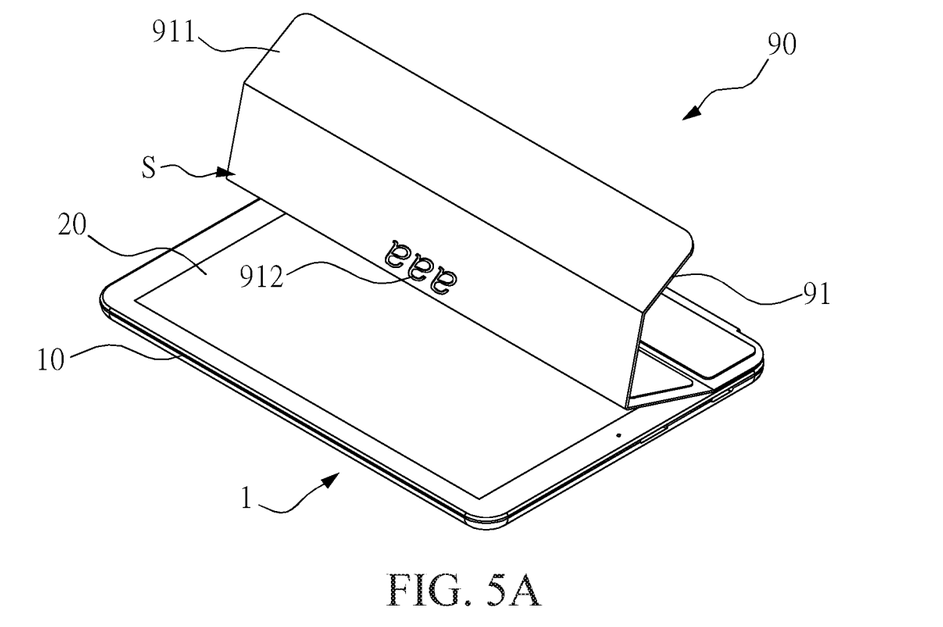
FIG. 5A is another implementation schematic diagram of the protective cover combined with the electronic device according to the present invention.
Figure 5B:
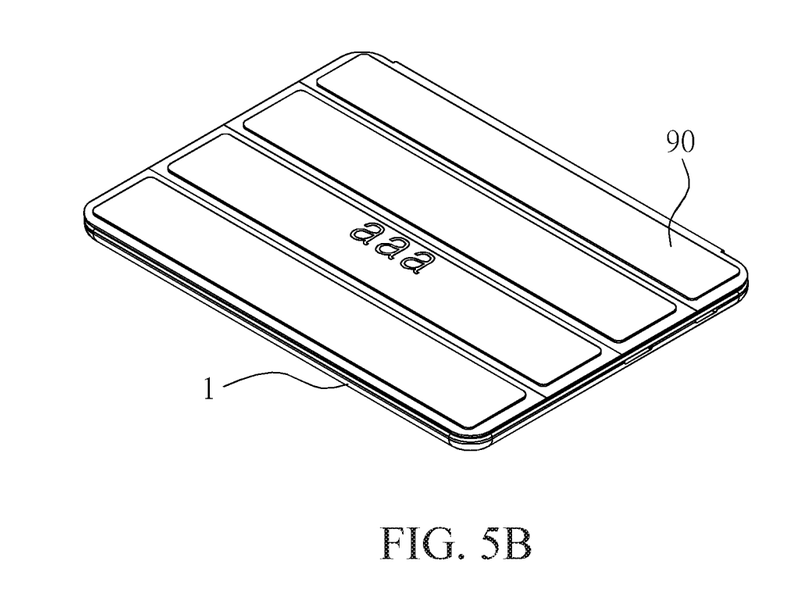
FIG. 5B is a schematic diagram illustrating the lifted cover body of the protective cover in FIG. 5A.

FIG. 5A and FIG. 5B are schematic diagrams of another embodiment of the protective cover combined with the electronic device in use.

As shown in FIG. 5A and FIG. 5B, in another embodiment of the present invention, the non-conducting area 912 of the cover body 91 of the protective cover 90 is located on an inner surface S touching the touch screen 20 when the cover body 91 covers the touch screen 20, and the shape of the non-conducting area 912 is a product logo. In this embodiment, it is assured that when a user purchases a brand of electronic device 1, such as the "aaa" brand, then if the user desires to use the method disclosed in the present invention, the user must purchase a protective cover 90 of the same brand. Similarly, in this embodiment, each product logo of the same brand matches a color according to the different graphic designs of each product logo. Each non-conducting area having different graphic designs enables the protective cover information generated by the touch screen 20 to be different. For example, assuming that the graphic design of the product logo of the cover body 91 shown in FIG. 5A matches the blue protective cover 90 in use, and that the non-conducting area 912 has a graphic design that can enable the touch screen 20 to generate the protective cover information after the inner surface S of the cover body 91 touches the touch screen 20, such as 0000, then the setting 0000 is the preset protective cover information, and the setting color information corresponding to the protective cover information is blue. Alternatively, the same product logo written with cursive script enables the touch screen 20 to generate other protective cover information when the inner surface S of the cover body 91 touches the touch screen 20, such as 0010. With reference to the lookup table in FIG. 4, the product logo written with cursive script matches the red protective cover 90. Via implementation of this embodiment, not only can the corresponding relationship between the protective cover information and the color information be determined, but this invention increases the likelihood that the user will purchase a protective cover 90 of the same brand as the electronic device 1.

Figure 6:
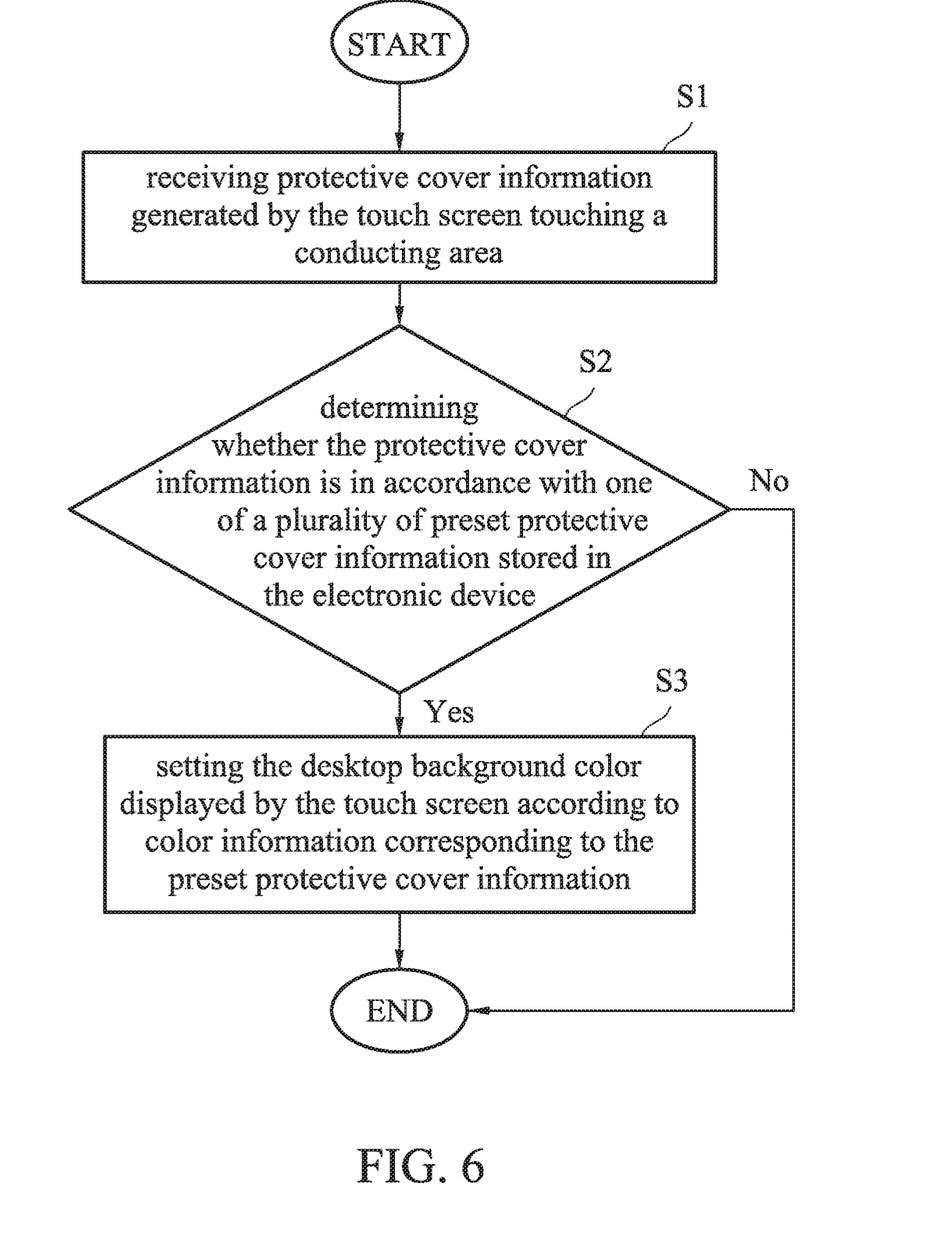
FIG. 6 is a step flow chart for the automatic method of setting a desktop background color of the present invention.

Please refer to FIG. 6 along with FIG. 2 and FIG. 4, in which detailed steps of the automatic method of setting a desktop background color according to the present invention are illustrated. FIG. 6 is a step flow chart of the automatic method of setting a desktop background color of the present invention. It should be noted that the electronic device 1 is used as an example in the following description illustrating the automatic method of setting a desktop background color disclosed in the present invention. However, the scope of the present invention is not limited by the abovementioned electronic device 1.

First, step S1 is executed: receiving protective cover information generated by the touch screen touching a conducting area.

As shown in FIG. 3, the automatic method of setting a desktop background color of the present invention is applied to an electronic device 1 with a touch screen 20. In the preferred embodiments, it is necessary that the electronic device 1 be combined with a special protective cover 90 in use. A cover body 91 used for covering the touch screen 20 of the protective cover 90 has a conducting area 911 and a non-conducting area 912, wherein a conducting area 911 of the cover body 91 of the protective cover 90 having a different color has a different shape, location, or area.

As shown in FIG. 2 and FIG. 3, when a user combines the abovementioned protective cover 90d with the electronic device 1, and the touch screen 20 is covered by the cover body 91 of the protective cover 90, the touch screen 20 generates corresponding protective cover information according to the location where the conducting area 911 touches the screen. Accordingly, once the user causes the cover body 91 to touch the touch screen 20, the control system 30 receives protective cover information generated by the touch screen 20.

Step S2: determining whether the protective cover information is in accordance with one of a plurality of preset protective cover information stored in the electronic device.

As shown in FIG. 2 and FIG. 3, after the control system 30 receives the protective cover information, the control system 30 determines whether the protective cover information is in accordance with one of a plurality of preset protective cover information stored in the electronic device 1. As mentioned above, the plurality of preset protective cover information is set according to protective cover information generated by each conducting area 911 having a different shape, location, or area. In principle, the quantity of the matching colors of the protective cover 90 corresponds to the same quantity of the preset protective cover information.

Step S3: setting the desktop background color displayed by the touch screen according to color information corresponding to the preset protective cover information.

When step S2 is executed, then if it is determined that the received protective cover information is in accordance with one of the plurality of preset protective cover information, the control system 30 sets the desktop background color displayed on the touch screen 20 according to the color information corresponding to the preset protective cover information. As mentioned above, the setting of the corresponding relationship between the preset protective cover information and the color information depends on the corresponding relationship between a color of the protective cover 90 and the protective cover information generated by the touch screen 20 touched by the protective cover 90. Therefore, after the control system 30 completes the setting according to the corresponding relationship between the abovementioned preset protective cover information and the color information, the desktop background color displayed by the touch screen 20 is consistent with the color of the protective cover 90. On the other hand, if the received protective cover information is not in accordance with any preset protective cover information, the desktop background color does not change and remains the same.

It should be noted that the automatic method of setting a desktop background color of the present invention is not limited to the step sequence mentioned above. As long as the objectives of the present invention are completed, the step sequence mentioned above also can be changed.

Based on the abovementioned illustration, the electronic device 1 can set the corresponding relationship between the preset protective cover information and the color information according to the corresponding relationship between the protective cover information generated when the cover body 91 of the protective cover 90 in use touches the touch screen 20 and the color of the protective cover 90, such that the electronic device 1 can automatically set the desktop background color displayed by the touch screen 20 to be consistent with the color of the protective cover 90 via executing the automatic method of setting a desktop background color disclosed in the present invention after the cover body 91 touches the touch screen 20.

In an embodiment of the invention, the electronic device 1 can obtains the preset protective cover information from a server (not shown in figures), e.g. a cloud server. When the electronic device 1 receives the protective cover information, the control unit 31 may determine whether the received protective cover information is in accordance with one of a plurality of preset protective cover information stored in the server. If the received protective cover information is in accordance with one of a plurality of preset protective cover information stored in the server, the electronic device 1 will obtain the preset protective cover information from the server.

In an embodiment of the invention, the system setting module 32 is further used for setting the desktop background subject displayed by the touch screen 20 of the electronic device 1 according to subject information corresponding to the preset protective cover information when the received protective cover information is in accordance with one of the plurality of preset protective cover information.

Figure 7:
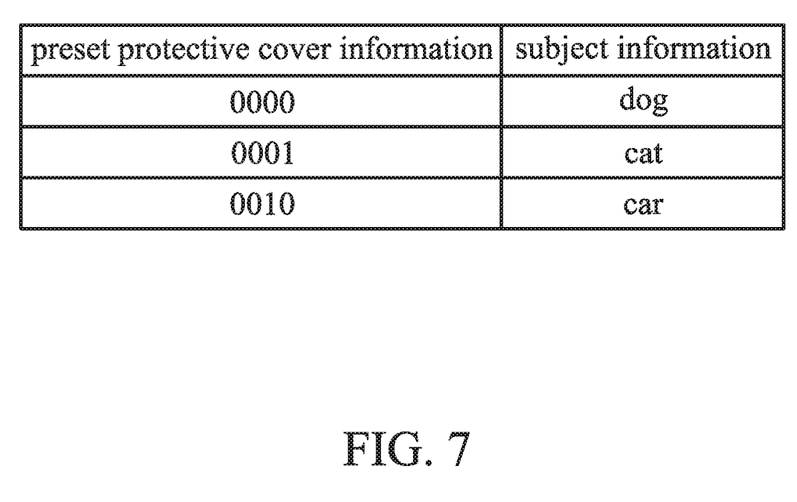
FIG. 7 is a lookup table illustrating the corresponding relationships between the preset protective cover information and the subject information.

FIG. 7 is a lookup table illustrating the corresponding relationships between the preset protective cover information and the subject information. In an embodiment of the invention, the shapes of the non-conducting areas 912 (i.e., the through holes) are different according to the subjects of the protective cover 90. In other words, the shapes, locations, or areas of the conducting area 911 are different when the subjects of the protective cover 90 are different. When the cover body 91 of a protective cover 90 of a different subject touches the touch screen 20, the protective cover information generated by the touch screen 20 is different. That is to say, when a cover body 91 touches the touch screen 20, a cover body 91 having a conducting area of different shape, location, or area triggers the touch screen 20 to generate corresponding protective cover information. The protective cover information is generated by computation after integration of the coordinate sensing signals generated by the conducting area 911 touching the touch screen 20. In the example illustrated in FIG. 7, the subject information corresponding to the preset protective cover information 0000 is set as dog; the subject information corresponding to the preset protective cover information 0001 is set as cat; and the subject information corresponding to the preset protective cover information 0010 is set as car. The shape, location, or area of the conducting area may vary depending on the subject of the protective cover 90, so the protective cover information generated by the touch screen 20 touching a cover body 91 of a protective cover 90 of a different subject is different too. As a result, by the above differences, the corresponding relationship between the preset protective cover information and the subject information can be set in advance, as in the lookup table shown in FIG. 7, so that the control system 30 can determine whether the desktop background subject needs to be changed and, if so, what subject the desktop background subject needs to be set to.

In an embodiment of the invention, the cover body 91 of the protective cover 90 is all composed by the conducting materials. That is to say, the whole cover body 91 can be regarded as the conducting area. Each cover body 91 of a different shape corresponds to different protective cover information (e.g. different color information or subject information).

Figure 8:
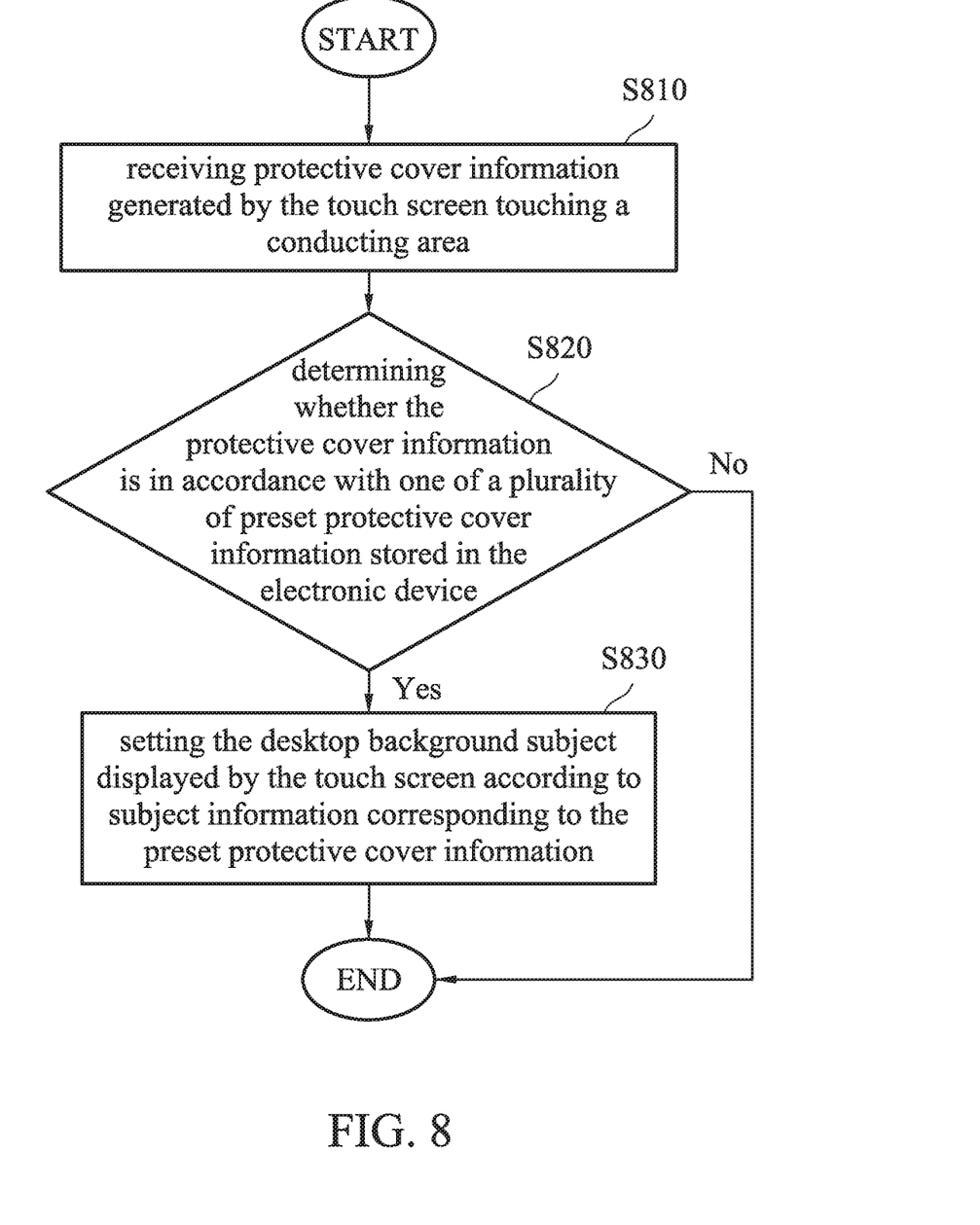
FIG. 8 is a step flow chart of the automatic method of setting a desktop background subject of the present invention.

FIG. 8 is a step flow chart of the automatic method of setting a desktop background subject of the present invention. It should be noted that the electronic device 1 is used as an example in the following description illustrating the automatic method of setting a desktop background subject disclosed in the present invention. However, the scope of the present invention is not limited by the abovementioned electronic device 1.

First, step S810 is executed: receiving protective cover information generated by the touch screen touching a conducting area.

Step S820: determining whether the protective cover information is in accordance with one of a plurality of preset protective cover information stored in the electronic device or a server.

As shown in FIG. 2 and FIG. 3, after the control system 30 receives the protective cover information, the control system 30 determines whether the protective cover information is in accordance with one of a plurality of preset protective cover information stored in the electronic device 1 or a server (not shown in figure). As mentioned above, the plurality of preset protective cover information is set according to protective cover information generated by each conducting area 911 having a different shape, location, or area.

Step S830: setting the desktop background subject displayed by the touch screen according to subject information corresponding to the preset protective cover information.

When step S2 is executed, then if it is determined that the received protective cover information is in accordance with one of the plurality of preset protective cover information, the control system 30 sets the desktop background subject displayed on the touch screen 20 according to the subject information corresponding to the preset protective cover information. As mentioned above, the setting of the corresponding relationship between the preset protective cover information and the subject information depends on the corresponding relationship between a subject of the protective cover 90 and the protective cover information generated by the touch screen 20 touched by the protective cover 90. Therefore, after the control system 30 completes the setting according to the corresponding relationship between the abovementioned preset protective cover information and the subject information, the desktop background subject displayed by the touch screen 20 is consistent with the subject of the protective cover 90. On the other hand, if the received protective cover information is not in accordance with any preset protective cover information, the desktop background subject does not change and remains the same.

It should be noted that the automatic method of setting a desktop background subject of the present invention is not limited to the step sequence mentioned above. As long as the objectives of the present invention are completed, the step sequence mentioned above also can be changed.

Based on the abovementioned illustration, the electronic device 1 can set the corresponding relationship between the preset protective cover information and the subject information according to the corresponding relationship between the protective cover information generated when the cover body 91 of the protective cover 90 in use touches the touch screen 20 and the subject of the protective cover 90, such that the electronic device 1 can automatically set the desktop background subject displayed by the touch screen 20 to be consistent with the subject of the protective cover 90 via executing the automatic method of setting a desktop background subject disclosed in the present invention after the cover body 91 touches the touch screen 20.

While the present invention has been particularly shown and described with reference to a preferred embodiment, it will be understood by those skilled in the art that various changes and modifications can be made to the described embodiments. It is intended to include all such variations, modifications, and equivalents which fall within the scope of the invention, as defined in the accompanying claims; it is to be understood that many other possible modifications and variations can be made without departing from the spirit and scope of the invention as hereinafter claimed.

What is claimed is:

1. An automatic method of setting a desktop background applied to an electronic device which is combined with a protective cover, wherein the protective cover has a conducting area corresponding to a specific shape, location or area and has a non-conducting area, the method comprising the following steps:
    receiving protective cover information generated by a touch screen of the electronic device touching the conducting area and the non-conducting area of the protective cover, wherein the protective cover information corresponds to the specific shape, location or area of the conducting area;
    determining whether the protective cover information is in accordance with one of a plurality of preset protective cover information; and
    setting the desktop background displayed by the touch screen according the preset protective cover information when the protective cover information is in accordance with one of the plurality of preset protective cover information.

2. The method as claimed in claim 1, wherein the plurality of preset protective cover information is stored in the electronic device or a server.

3. The method as claimed in claim 2, the step of setting the desktop background according the preset protective cover information further comprising:
    setting a desktop background color displayed by the touch screen according to color information corresponding to the preset protective cover information.

4. The method as claimed in claim 2, the step of setting desktop background according the preset protective cover information further comprising:
    setting a desktop background subject displayed by the touch screen according to subject information corresponding to the preset protective cover information.

5. The method as claimed in claim 2, wherein the non-conducting area is a through hole.

6. The method as claimed in claim 5, wherein the through hole has a shape, and the shape of the through hole corresponds to the protective cover information.

7. The method as claimed in claim 2, wherein the non-conducting area is located on an inner surface of the protective cover.

8. The method as claimed in claim 7, wherein a shape of the non-conducting area is a product logo and different product logos correspond to different protective cover information.

9. An electronic device, comprising:
    a main body, combining with a protective cover, wherein the protective cover has a conducting area corresponding to a specific shape, location or area and has a non-conducting area;
    a touch screen, connected with the main body, and used for generating protective cover information after touching the conducting area and the non-conducting area, wherein the protective cover information corresponds to the specific shape, location or area of the conducting area; and
    a control system, electrically coupled with the touch screen, and used for receiving the protective cover information and for determining whether the protective cover information is in accordance with one of a plurality of preset protective cover information,
    wherein the control system sets desktop background displayed by the touch screen according the preset protective cover information when the protective cover information is in accordance with one of the plurality of preset protective cover information.

10. The electronic device as claimed in claim 9, wherein the plurality of preset protective cover information is stored in the electronic device or a server.

11. The electronic device as claimed in claim 10, wherein the control system sets a desktop background color displayed by the touch screen according to color information corresponding to the preset protective cover information.

12. The electronic device as claimed in claim 10, wherein the control system sets a desktop background subject displayed by the touch screen according to subject information corresponding to the preset protective cover information.

13. The electronic device as claimed in claim 10, wherein the non-conducting area is a through hole.

14. The electronic device as claimed in claim 13, wherein the through hole has a shape, the shape of the through hole corresponds to the protective cover information.

15. The electronic device as claimed in claim 10, wherein the non-conducting area is located on an inner surface of the protective cover.

16. The electronic device as claimed in claim 15, wherein a shape of the non-conducting area is a product logo and different product logos correspond to different protective cover information.

* * * * *